United States Patent [19]

Sugimura et al.

[11] Patent Number: 4,841,498
[45] Date of Patent: Jun. 20, 1989

[54] INFORMATION RECORDING/REPRODUCING APPARATUS WITH MEANS FOR SUBSTITUTING PREDETERMINED GOOD SECTORS FOR DEFECTIVE ONES

[75] Inventors: Tatuo Sugimura, Yawata; Isao Satoh, Neyagawa; Yoshihiko Imai, Hirakata; Makoto Ichinose, Sakai, all of Japan

[73] Assignee: Matsushita Electric Industrial Co., Ltd., Osaka, Japan

[21] Appl. No.: 710,216

[22] Filed: Mar. 11, 1985

[51] Int. Cl.[4] ............................................. G11B 17/22
[52] U.S. Cl. ........................................ 369/32; 369/58; 360/53; 365/200
[58] Field of Search ............... 360/53, 60, 31; 369/32, 369/54, 58, 53; 371/10; 365/200

[56] References Cited

U.S. PATENT DOCUMENTS

| | | | |
|---|---|---|---|
| 3,422,402 | 1/1969 | Sakalay | 371/10 X |
| 4,189,767 | 2/1980 | Ahuja | 364/200 |
| 4,214,280 | 7/1980 | Halfhill et al. | 360/53 |
| 4,420,807 | 12/1983 | Nolta et al. | 365/200 |
| 4,507,693 | 3/1985 | Matsuda et al. | 360/72.2 |
| 4,520,453 | 5/1985 | Chow | 364/900 |
| 4,546,462 | 10/1985 | Koishi et al. | 369/46 X |
| 4,558,446 | 12/1985 | Banba et al. | 371/10 |

FOREIGN PATENT DOCUMENTS

| | | | |
|---|---|---|---|
| 19924 | 12/1980 | European Pat. Off. | 369/54 |
| 57-186268 | 5/1981 | Japan | 360/78 |
| 56-165968 | 12/1981 | Japan | 369/58 |
| 51-55580 | 4/1982 | Japan | 360/49 |
| 58-3103 | 1/1983 | Japan | 360/31 |
| 58-83312 | 5/1983 | Japan | 360/78 |
| 59-98806 | 6/1983 | Japan | 369/53 |

OTHER PUBLICATIONS

English Translation of JP 58-98806.
Translation of JP 58-3103.

*Primary Examiner*—Aristotelis M. Psitos
*Attorney, Agent, or Firm*—Stevens, Davis, Miller & Mosher

[57] ABSTRACT

An information recording and reproducing apparatus for recording information on the recording medium and reproducing the information from the recording medium has a data recording region of a sector structure in which the region is divided into a plurality of sectors. There are provided means for designating alternate sector to be used in place of a defective sector and means for adding to data a logical address of a sector where the data is to be recorded. Reproduction from the sector where the desired data is recorded can be accomplished by using only a physical address without being influenced by difference between the physical address and the logical address brought about by the occurrence of the defective sector.

9 Claims, 3 Drawing Sheets

INFORMATION RECORDING/REPRODUCING APPARATUS WITH MEANS FOR SUBSTITUTING PREDETERMINED GOOD SECTORS FOR DEFECTIVE ONES

BACKGROUND OF THE INVENTION

1. Field of the Invention

The present invention relates to an apparatus for recording and/or reproducing information on or from a recording medium having a recording region divided into a plurality of recording areas or sectors.

2. Description of the Prior Art

In the information recording/reproducing apparatus for performing data recording or reproduction on the sector basis, the information must be able to be recorded or reproduced at or from a designated sector. In this connection, it is noted that in the case of the information recording/reproducing apparatus in which a recording medium exhibiting poor error-free characteristics such as an optical disc, there may make appearance a defective sector which must be identified before recording or through confirmation of the written data. In the system in which the address of the sector where data is to be recorded is directly designated by the user, the data must be able to be recorded notwithstanding of the presence of the defective sector. Accordingly, there is required an alternate sector in which data destined to be recorded in the defective sector is actually recorded. More specifically, when a sector designated by the user for recording data is found defective, it is required that the data be recorded in an alternate sector so that the data is in appearance recorded or reproduced at or from the sector designated by the user. This means that a difference may arise between the address of the recording sector designated by the user (i.e. the logical address) and the address of the sector where the data is actually recorded (i.e. the physical address). Under the circumstance, in the hitherto known data recording/reproducing apparatus, correspondence is established between the logical addresses and the physical addresses by resorting to the use of a directory. In the prior art apparatus of this type, it is necessary to update the directory every time the defective sector makes an appearance in the recording mode. Further, retrieval of data can be performed only after the physical address is determined by referring to the directory. Besides, since the directory must be permanently resident in a memory area of the operating system, the capacity required therefor can not be neglected when the number of the sector is large.

SUMMARY OF THE INVENTION

An object of the present invention is to provide an information or data recording/reproducing apparatus which avoids the shortcomings of the prior art apparatus.

In view of the above object, there is provided according to an aspect of the invention an information or data recording/reproducing apparatus for recording or reproducing on or from a recording medium having a recording region of a sector structure in which the recording region is divided into a plurality of recording areas or sectors, which apparatus comprises means for designating an alternate sector for the sector which is determined to be defective upon recording of data, said means being adapted to determine the physical address of the alternate sector definitely from that of the defective sector, and means for adding to the data the logical address of the sector where that data is to be recorded. According to another aspect of the invention, there is provided in addition to the alternate sector designating means and the logical address adding means, a means for sending out data upon detection of coincidence between the logical address of the sector being retrieved and the logical address included in the data reproduced in the reproducing operation, whereby the direct access to the sector can be made without resorting to one-to-one mapping of the physical address from the logical address by referring to the directory or the like.

DESCRIPTION OF THE PREFERRED EMBODIMENTS

Figure 1:
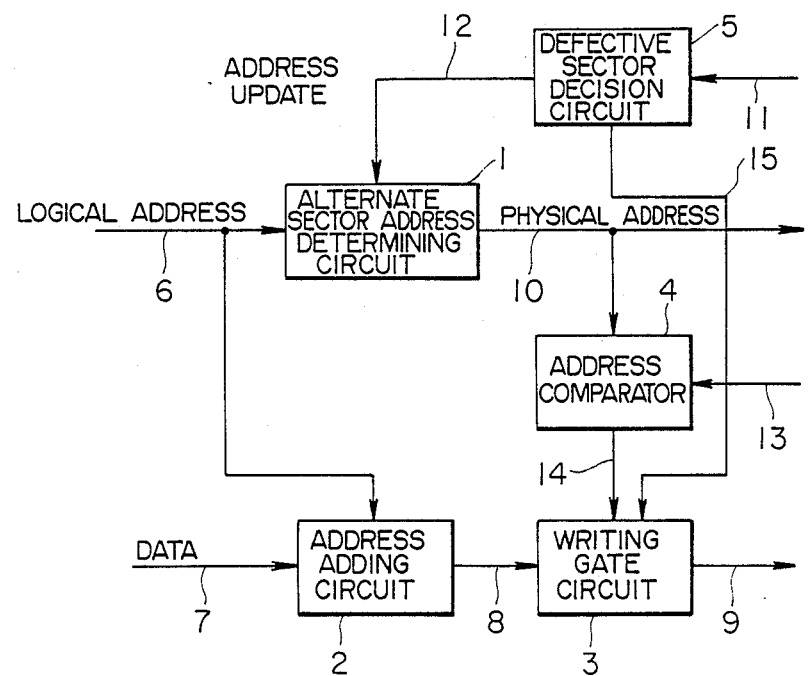
FIG. 1 is a block diagram showing an arrangement of a recording circuit employed in an information recording/reproducing apparatus according to an embodiment of the present invention.

FIG. 1 shows in a block diagram a recording circuit employed in an information recording/reproduction apparatus according to an embodiment of the invention. In FIG. 1, a reference numeral 1 denotes an alternate sector address determining circuit, 2 denotes an address adding circuit, 3 denotes a writing gate circuit, 4 denotes an address comparison circuit, 5 denotes a defective sector decision circuit, 6 denotes a logical address signal, 7 denotes an original data signal, 8 denotes an address-added data signal, 9 denotes a recording data signal, 10 denotes a physical address signal, 11 denotes a reproduced signal, 12 denotes an address updating trigger signal, 13 denotes a reproduced address signal, 14 denotes a writing trigger signal, and 15 denotes a sector 6 blank check signal. Operation of the recording circuit will be described on the assumption that the original data 7 is recorded at a sector designated by the logical address signal 6. The address adding circuit 2 is so arranged as to add the logical address 6 to the original data 7 to thereby create the address-added data signal 8. First, the alternate sector address determining circuit 1 sends out the logical address 6 as the physical address 10. The defective sector deciding circuit 5 checks whether the sector designated by the physical address 10 has already been recorded or suffers a permanent defect or fault. When it is found as the result of the checking operation that data is allowed to be written in the sector in concern, the sector blank check signal 15 is supplied to the writing gate circuit 3. Upon detection of coincidence between the reproduced address 13 and the physical address 10 by the address comparator 4, the writing trigger signal 14 is applied to the writing gate circuit 3. After the reception of the sector blank check signal 15, the writing gate circuit 3 sends out the recording data 9 (i.e. data to be recorded) in response to the writing trigger signal 14. Further, the data writing is confirmed. More specifically, the data is reproduced from the recorded sector, wherein the defective sector decision circuit 5 checks or examines the reproduced signal 11. If no error is contained in the reproduced signal 11, the data recording at the sector designated by the logical address 6 is completed. On the other hand, when the sector designated by the physical address 10 has already been written with data or a permanent defect is present in the sector, resulting in generation of no sector blank check signal 15, or when confirmation of the writing or recording can not be made, the defective sector decision circuit 5 decides that the sector under consideration is defective and supplies the address updating trigger signal 12 to the alternate sector address determining circuit 1, which then sends out, as the physical address 10, the address of an alternate sector in place of the sector designated by the physical address at that time, to thereby allow the recording process to be repeated.

Figure 2:
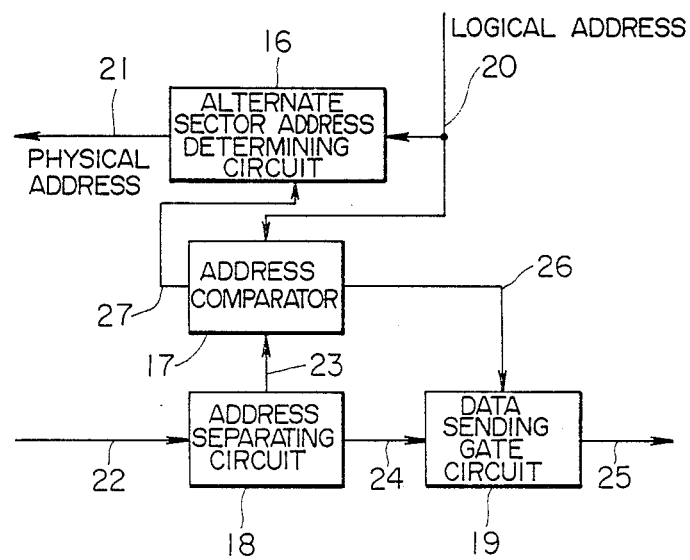
FIG. 2 is a block diagram showing an arrangement of a reproducing circuit employed in the same apparatus.

FIG. 2 shows in a block diagram a circuit arrangement for reproducing the information or data recorded by the recording apparatus shown in FIG. 1 according to an embodiment of the invention. In FIG. 2, a reference numeral 16 denotes an alternate sector address determining circuit, 17 denotes an address comparator, 18 denotes an address separating circuit, 19 denotes a data sending gate circuit, 20 denotes a logical address signal, 21 denotes a physical address signal, 22 denotes a reproduced data signal, 23 denotes an intra-data address (i.e. address included in the data), 24 denotes a candidate data signal, 25 denotes data to be sent out, 26 denotes a sending trigger signal, and 27 denotes an address updating trigger signal. Operation will be described in connection with the reproduction of the data recorded at a sector designated by the logical address 20. The alternate sector address determining circuit 16 first sends out the logical address 20 as the physical address 21. The data 22 reproduced from the sector designated by the physical address 21 is separated into the intradata address 23 and the candidate data 24 by means of the address separating circuit 18. The address comparator 17 produces the sending or transmission trigger signal 26 upon detection of coincidence between the logical address 20 and the intra-data address 23. The data sending gate circuit 19 outputs the candidate data 24 as the sending data 25 in response to application of the sending trigger signal 26. When the sending trigger signal 26 is not produced, i.e. when the logical address 20 does not coincide with the intra-data address 23, the sector in concern is decided to be the defective sector, whereby the alternate sector address determining circuit 16 responds to the address updating trigger signal 27 to send out, as the physical address 21, the address of an alternate sector to replace the sector designated by the physical address 21 at that time point. This reproducing process is repeated. The alternate sector address determining circuit 16 of the reproducing system shown in FIG. 2 is functionally identical with the alternate sector address determining circuit 1 of the recording system shown in FIG. 1 in respect that the first input logical addresses 6 and 20 are sent out as the physical addresses 10 and 21 in the recording and reproducing operations, respectively. The address updating trigger signal 12 or 27 is continuously inputted until the recording or reproduction has been completed. More specifically, when the sector designated by the physical address 10 or 21 is found to be defective, the address of an alternate sector to replace the sector designated by the physical address 10 or 21 at that time point is sent out as the physical address 10 or 21.

Figure 3:
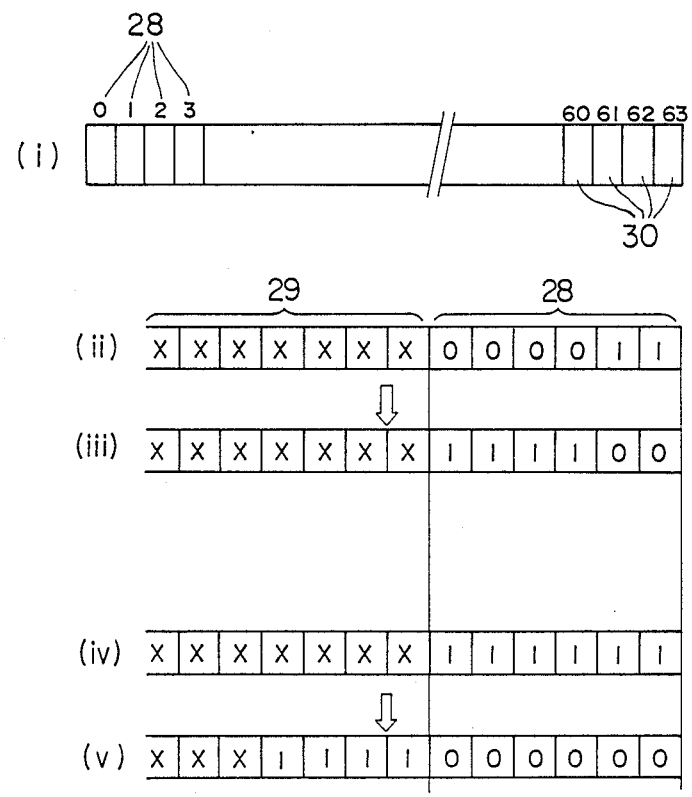
FIGS. 3 and 4 are views for illustrating two examples of procedure for determining the address of an alternate sector in an alternate sector address determining circuit used in the information recording/reproducing apparatus.

Next a procedure for determining the address of an alternate sector as performed by the alternate sector address determining circuit 1 or 16 upon occurrence of the defective sector will be described in conjunction with two examples. FIG. 3 is a view for illustrating an example of the procedure for determining the address of an alternate sector in the alternate sector address determining circuits 1 and 16 shown in FIGS. 1 and 2, respectively. Referring to FIG. 3, a reference numeral 28 denotes a physical address, 29 denotes a physical track address, and 30 denotes alternate sectors. In the case of the illustrated example, it is assumed that a signal track is constituted by 64 sectors, as in the case of an information recording/reproducing apparatus in which a disclike recording medium such as an optical disc, a magnetic disc or other is employed. In that case, a particular sector is designated by a combination of the physical track address 29 and the physical sector address 28. As is shown in FIG. 3 at (i), there are prepared four alternate sectors constituted by the sixtieth to sixty-third sectors, respectively, for 60 sectors including the zeroth sector to the fifty-ninth sector. Further, an alternate track composed only of the alternate sectors is prepared for 15 tracks each of which has the configuration or format mentioned above. It is now assumed that recording or reproduction is to be performed at or form the third sector of a given one of the tracks. Then, the alternate sector address determining circuit 1 or 16 shown in FIGS. 1 or 2 is first inputted with the logical address 6 or 20, whereupon the physical address 10 or 21 is sent out in the form illustrated in FIG. 3 at (ii). If a defective sector is detected before completion of the recording or reproducing operation, the physical address 10 or 21 is sent out which includes, as the physical sector address 28, the leading sector address of an alternate sector of the track in concern, as illustrated in FIG. 3 at (iii). It is pressumed that an alternate for the alternate sector itself is the sector which follows immediately after the latter. When an alternate sector which is not defective is not found on the track in concern, i.e. when a defective sector is detected where the physical address 10 or 21 is in the form illustrated at (iv) in FIG. 3, a predetermined value, e.g. the fifteenth address is placed in the least significant four bits of the physical track address 29, while the physical sector address 28 is placed with the zeroth address, i.e. the address of the leading alternate sector of the alternate track, whereby the physical address 10 or 21 of the format shown at (v) in FIG. 3 is sent out. Of course, it is not always necessary to dispose the alternate track adjacent to 15 tracks to be replaced thereby. The former may be disposed at a location remote from the 15 tracks.

Figure 4:
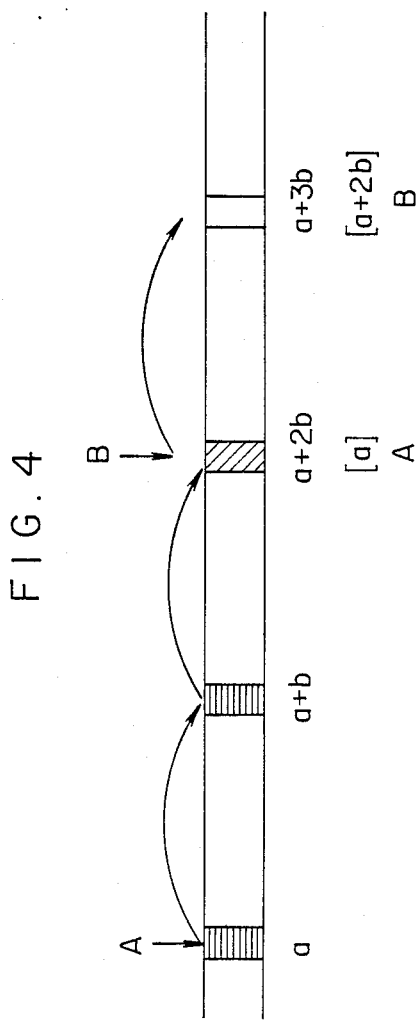

FIG. 4 is a view illustrating another example of the procedure for determining the address of the alternate sector by the alternate sector address determining circuit 1 or 16 shown in FIGS. 1 or 2. In the case of this example, no alternate areas or sectors are previously prepared in contrast to the procedure described above in conjunction with FIG. 3. Instead, when a defective sector is detected, the alternate sector address determining circuit 1 or 16 determines as the alternate sector the one which is designated by a relative address of a certain value for the physical address 10 or 21 upon occurrence of the defective sector. More specifically, a relative address of a certain value, e.g. an address b is added to the physical address 10 or 21 to be sent out as the renewed physical address 10 or 21. Referring to FIG. 4, it is assumed that sectors of addresses a and b of the physical address 10 or 21 are defective. In that case, when data A is to be recorded or reproduced on or from the sector of the address a in response to the logical address 6 or 20, the physical address 10 or 21 sent out by the alternate sector address determining circuit 1 or 16 will vary from the address a to the address (a+b) and hence to (a+2b), wherein the data A is recorded or reproduced on or from the sector of which physical address 10 or 21 is (a+2b). If data B is to be recorded or reproduced on or from the sector of the address (a+2b) in response to the logical address 6 or 20, the sector whose physical address 10 or 21 is (a+2b) is regarded as the defective sector because of the presence of the data A. Accordingly, the physical address 10 or 21 sent out from the alternate sector address determining circuit 1 or 16 varies from the address (a+2b) to (a+3b), whereby the data B is recorded or reproduced on or from the sector whose physical address 10 or 21 is (a+3b). Although the scheme illustrated in FIG. 4 requires a longer mean access time as compared with that shown in FIG. 3, the former can assures an improved utilization efficiency of sector because no alternate areas are previously determined.

As will be appreciated from the foregoing description, in the information or data recording/reproducing apparatus according to the present invention, management of the alternate sector for dealing with the defective sector can be realized without resorting to the use of a mapping device for the logical address and the physical address such as directory or the like by virtue of addition to the data to be recorded of the logical address of the sector where that data is to be recorded, while allowing the sector to be directly accessed with the logical address. Further, the addition of the logical address to the information or data to be retrieved facilitates the determination as to whether the retrieved data is the desired one or not, assuring data reproduction with high reliability. Thus, more elabrate sector management can be advantageously accomplished in the information recording/reproducing apparatus in which a recording medium exhibiting rather poor error-free characteristics such as the optical disc is employed.

What is claimed is:

1. An information recording and reproducing apparatus comprising:
   means for recording information on a recording medium and reproducing the same therefrom, said recording medium having a recording/reproducing structure in which an information recording-/reproducing region is divided into a plurality of addressable sectors;
   means for providing a logical address for a sector designated for recording;
   means for receiving said logical address and for designating a first physical address of said sector designated for recording;
   means for detecting whether said sector designated for recording is defective;
   means responsive to detection that the sector designated for recording is defective for designating an alternate recording sector to be used in place of the defective sector, said means for designating the alternate recording sector controlling said means for designating the first physical address so that said means for designating designates a second physical address of an alternate recording sector each time a defective recording sector is detected;
   means for adding said logical address to recordable data to form an address-added data signal having a logical address portion and a data portion; and
   means for recording said address-added data signal at a sector having said first physical address when a defective sector is not detected, and at a sector having said second physical address when a defective sector is detected.

2. An information recording and reproducing apparatus as in claim I, further comprising:
   means for providing a logical address of a sector to be reproduced;
   coincidence detecting means for detecting coincidence between said logical address of the sector to be reproduced and a logical address portion included in the address-added data signal reproduced from said sector to be reproduced; and
   means for sending out the reproduced data portion from the address-added data signal of the sector to be reproduced upon detection of a coincidence of said logical address of a sector to be reproduced and said logical address portion included in the address-added reproduced data signal from said sector to be reproduced.

3. An information recording and reproducing apparatus as in claim 2, further comprising:
   means responsive to a lack of coincidence between said logical address of a sector to be reproduced and said logical address portion included in the address-added data signal from said sector to be reproduced for designating an alternate recorded sector to be reproduced in place of said sector to be reproduced;
   said coincidence detecting means detecting for a coincidence between said logical address of the sector to be reproduced and the logical address portion included in an address-added data signal reproduced from said alternate recorded sector;
   said means for sending out operating to send out the reproduced data portion of the address-added data signal of the alternate recorded sector upon detection of a coincidence of the logical address of the sector to be reproduced and the logical address portion included in the address-added data signal reproduced from said alternate recorded sector.

4. An information recording and reproducing apparatus as in claim 3 wherein said means responsive to lack of coincidence repeatedly designates alternate recorded sectors to be reproduced until there is coincidence detected between said logical address of a sector to be reproduced and a logical address portion included in an address-added data signal reproduced from an alternate recorded sector.

5. An information recording and reproducing means as in claim 2 wherein said alternate recording sector is selected in accordance with a predetermined selection sequence of a plurality of possible alternate recording sectors and said means for designating said alternate recording sector designates a physical address of a next in line alternate recording sector of said plurality as said second physical address each time recording sector is detected.

6. An information recording and reproducing means as in claim 2 wherein said alternate recording sector is selected, using relative addressing, from a plurality of possible alternate recording sectors, each of which has a relative address relationship with said first physical address, the address of a selected alternate recording sector being used as said second physical address.

7. An information recording and reproducing means as in claim 1 wherein said alternate recording sector is selected in accordance with a predetermined selection sequence of a plurality of possible alternate recording sectors and said means for designating said alternate recording sector designates a physical address of a next in line alternate recording sector of said plurality as said second physical address each recording sector is detected.

8. An information recording and reproducing means as in claim I wherein said alternate recording sector is selected, using relative addressing, from a plurality of possible alternate recording sectors, each of which has a relative address relationship with said first physical address, the address of a selected alternate recording sector being used as said second physical address.

9. An information recording and reproducing apparatus comprising:
  means for recording a signal on a recording medium and reproducing the signal therefrom having a sector structure in which an information recording region is divided into a plurality of sectors;
  defective sector decision means receiving a reproduced signal from a sector designated by a physical address for has been properly recorded or as a defect deciding whether the sector designated by the physical address and for delivering an address update signal or a sector blank check signal depending on a result of the decision;
  alternate sector address determining means receiving a logical address entered by a user and the address update signal from said defective sector decision means for delivering the physical address corresponding to the logical address if the address update signal is not received and for delivering a physical address of an alternate sector when the address update signal is received.
  address comparator means receiving the physical address from said alternate sector address determining means and a reproduced address for comparing the physical address with the reproduced address to deliver a writing trigger signal when a coincidence therebetween is detected;
  address adding means receiving the logical address entered by the user and original data to be recorded for adding the logical address to the original data to thereby form address-added data; and
  writing gate means receiving the address-added data from said address adding means, the writing trigger signal from said address comparator means, and the sector blank check signal from said defective sector decision means, for delivering said address-added data for recording in response to the writing trigger signal when the sector blank check signal is received.

* * * * *

UNITED STATES PATENT AND TRADEMARK OFFICE
CERTIFICATE OF CORRECTION

PATENT NO. : 4,841,498
DATED : June 20, 1989
INVENTOR(S) : Tatuo SUGIMURA, et al It is certified that error appears in the above-indentified patent and that said Letters Patent is hereby corrected as shown below:

Claim 9, lines 28-30, should read as follows:

--address for deciding whether the sector designated
by the physical address has been properly
recorded or has a defect and for delivering an address--

Signed and Sealed this

Twenty-seventh Day of May, 1997

Attest:

BRUCE LEHMAN

Attesting Officer

Commissioner of Patents and Trademarks